United States Patent
Kapsokavathis et al.

(10) Patent No.: US 7,290,525 B1
(45) Date of Patent: Nov. 6, 2007

(54) METHODS AND APPARATUS FOR AN ENGINE SPEED CONTROLLER USING GENERATOR TORQUE LOAD

(75) Inventors: Nick S. Kapsokavathis, Shelby Township, MI (US); Chandra S. Namuduri, Troy, MI (US); David W. Walters, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/553,487

(22) Filed: Oct. 27, 2006

(51) Int. Cl.
*F02D 29/00* (2006.01)
(52) U.S. Cl. ............... 123/329; 123/350; 180/65.2
(58) Field of Classification Search ......... 123/329, 123/350, 352; 701/22, 36; 180/65.2, 65.3
See application file for complete search history.

(56) References Cited

U.S. PATENT DOCUMENTS 6,581,705 B2 * 6/2003 Phillips et al. ............ 180/65.2

7,009,365 B1 * 3/2006 Namuduri et al. .......... 322/23

FOREIGN PATENT DOCUMENTS

JP 2003-41973 A * 2/2003

\* cited by examiner

*Primary Examiner*—Hieu T. Vo

(57) ABSTRACT

An engine control system for use in connection with vehicles and the like allows the engine speed to be modified using the torque load from the electrical generator. The engine is subject to a torque load from a generator coupled to the engine. The controller compares the desired speed to the actual speed of the engine to determine an error value, and the torque load of the generator is modified (increased/decreased) based on the error value such that the absolute value of the error value is reduced. The generator control is combined with and arbitrated with respect to traditional spark control methods, thus reducing the need for spark timing that is substantially retarded from the mean best timing (MBT) setting. The electrical generator can operate in either voltage control mode or field duty cycle control mode, depending upon various conditions.

17 Claims, 2 Drawing Sheets

METHODS AND APPARATUS FOR AN ENGINE SPEED CONTROLLER USING GENERATOR TORQUE LOAD

TECHNICAL FIELD

The present invention relates generally to engine control systems and, more particularly, to engine speed control schemes used in connection with, for example, automotive vehicles.

BACKGROUND OF THE INVENTION

Internal combustion engines such as those used in automotive vehicles and the like require some form of control scheme to maintain a desirable idle speed. This idle speed may be perturbed by a number of factors, including, for example, various electrical and mechanical loads on the engine and environmental conditions.

Conventional idle control schemes use two control components: a throttle that controls airflow into the engine, and a spark controller that advances or retards the spark of the engine. Each of these control components have advantages and disadvantages. For example, while the throttle provides increased authority with respect to changing engine torque, it exhibits a relatively slow response. And while a spark controller provides relatively quick response, it has limited authority to change engine torque. As a result, both throttle and spark are typically used to control idle speed.

The use of spark as a torque control device, however, requires retarding the steady-state spark back from the most efficient point, known as the mean best timing (MBT). This results in increased fuel consumption and/or a reduction in fuel economy.

Accordingly, there is a need for an improved engine control scheme that is responsive while at the same time providing a wide range (authority) of torque control. Other desirable features and characteristics of the present invention will become apparent from the subsequent detailed description and the appended claims, taken in conjunction with the accompanying drawings and the foregoing technical field and background.

SUMMARY OF THE INVENTION

In general, an engine control system in accordance with the present invention allows the engine speed to be modified using the torque load from the electrical generator. The controller compares the desired speed to the actual speed of the engine to determine an error value, and the torque load of the generator is modified (increased/decreased) based on the speed error value such that the absolute value of the error value is reduced. The generator control is combined with and arbitrated with respect to traditional spark control methods, thus reducing the need for spark timing that is substantially retarded from the mean best timing (MBT) setting. An engine control module is employed to determine an optimal arbitration of spark control and generator control based on the state of the battery, external loads, vehicle deceleration, and/or other factors. The electrical generator can operate in either voltage control mode or field duty cycle control mode, depending upon various conditions.

DESCRIPTION OF THE DRAWINGS

A more complete understanding of the present invention may be derived by referring to the detailed description and claims when considered in conjunction with the following figures, wherein like reference numbers refer to similar elements throughout the figures.

DESCRIPTION OF AN EXEMPLARY EMBODIMENT

The following detailed description is merely illustrative in nature and is not intended to limit the scope or application of possible embodiments. Furthermore, there is no intention to be bound by any expressed or implied theory presented in the preceding technical field, background, brief summary or the following detailed description.

Various embodiments may be described herein in terms of functional and/or logical block components and various processing steps. It should be appreciated that such block components may be realized by any number of hardware, software, and/or firmware components configured to perform the specified functions. For the sake of brevity, conventional techniques related to engines, electrical generators, automotive actuators, and traditional control systems will not be described herein.

In general, an engine speed control system in accordance with the present invention uses electrical generator torque as a control component in addition to the traditionally employed air component (via throttle) and spark component (via advance/retardation of timing).

Figure 1:
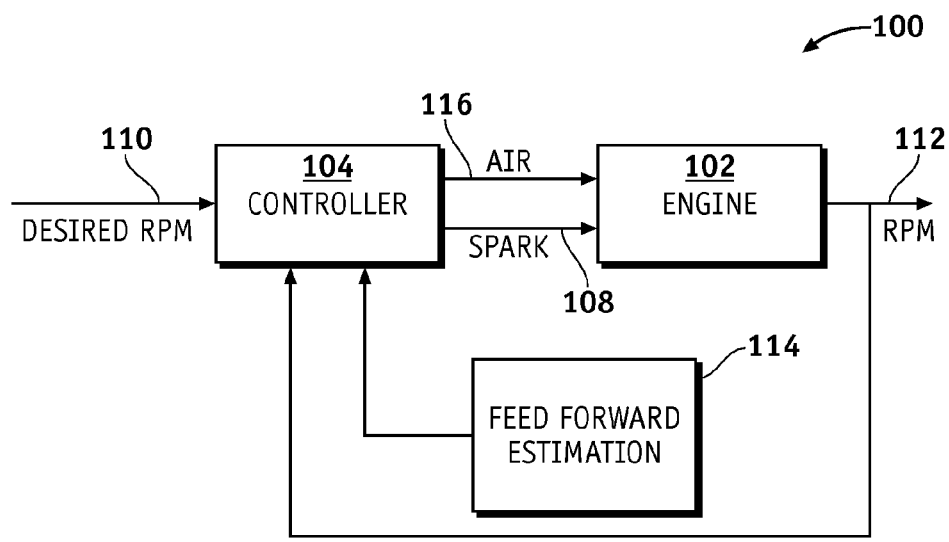
FIG. 1 is a functional block diagram of an exemplary prior art engine control system.

More particularly, referring to FIG. 1, a conventional engine idle speed control system 100 includes a controller (with an associated control algorithm) 104 that accepts an input 110 indicative of a desired RPM, and provides air control 106 and spark control 108 to engine 102, where engine 102 has an associated speed output (RPM) 112. Air control 106 may provided through one or more conventional actuators (e.g., a throttle). Similarly, spark control 108 may be provided through any conventional spark controller—e.g., a controller that advances or retards the spark of engine 102 to achieve speed control.

A feedforward estimation block 114 provides an estimation of load torque (of engine 102) to controller 104. A feedback loop from engine speed output 110 is also provided to controller 104. Controller 104 then uses these signals to provide a suitable combination of air and spark control 106 and 108.

As mentioned previously, air control 106 is relatively slow, but provides increased authority with respect to changing engine torque. At the same time, spark control 108 is relatively fast, but has limited authority to change the torque of engine 102. That is, the steady-state spark is retarded from the most efficient point, known as the Mean Best Timing (MBT) to provide a torque reserve. This spark retardation can cause increased fuel consumption and/or loss in fuel economy.

Figure 2:
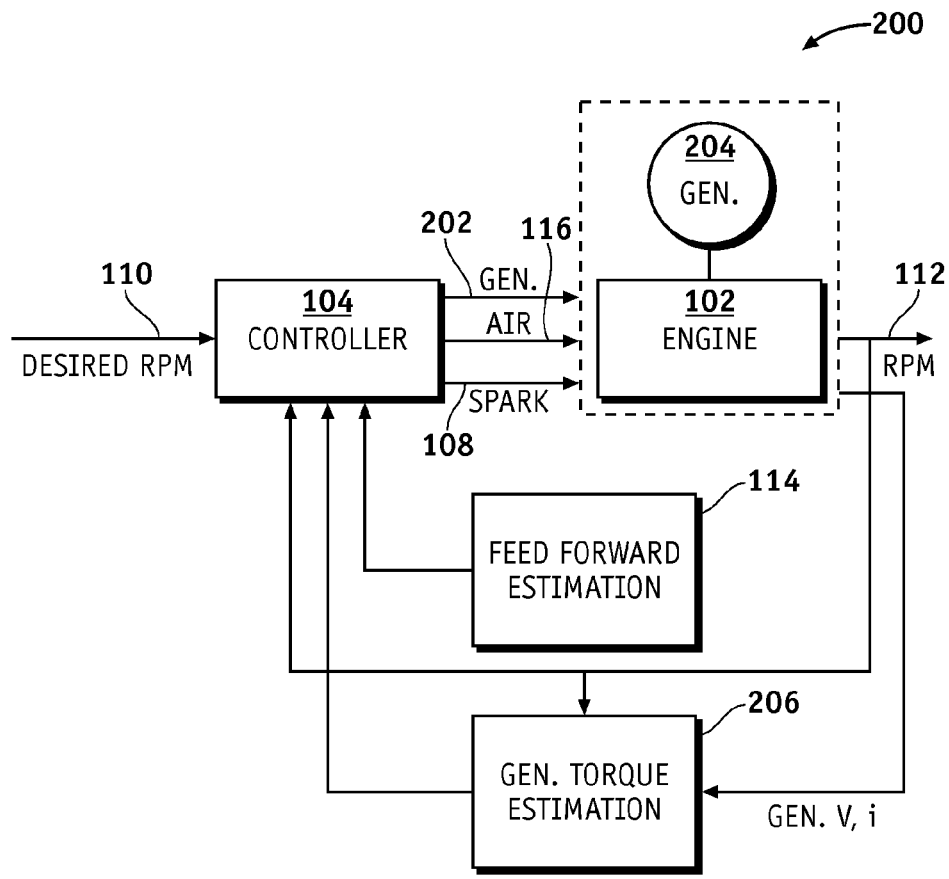
FIG. 2 is a functional block diagram of an engine control system in accordance with one embodiment of the present invention.

In accordance with one embodiment of the present invention, however, a generator control signal is introduced. That is, referring to FIG. 2, a generator control 202 is provided, via any suitable combination of actuators and signals (described further below), to generator 204 coupled to engine 102. A generator torque estimation block 206 receives the generator voltage and current and provides controller 104 with a feedback signal indicative of the estimated torque. The torque load on the engine, as is known in the art, is typically expressed as a force acting at a distance (e.g., N·m), tangential to the rotation path.

Figure 3:
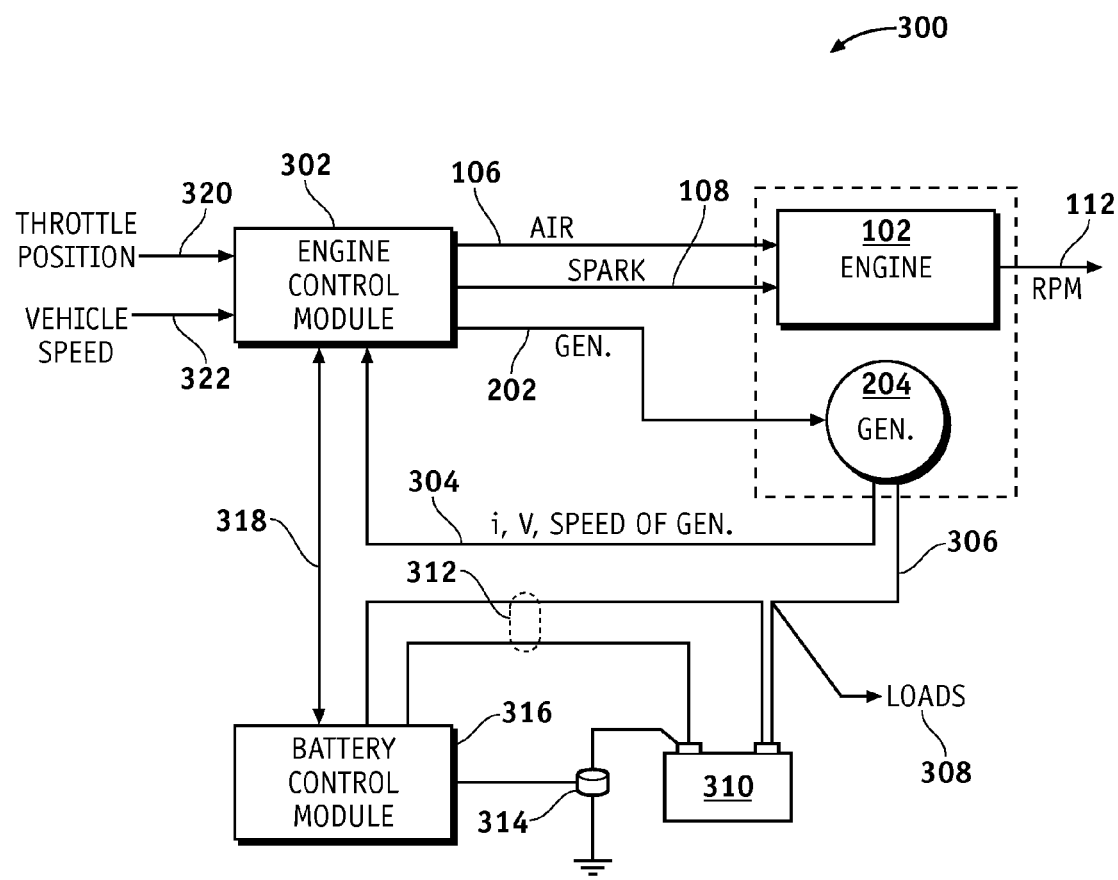
FIG. 3 is a functional block diagram of a particular embodiment of the present invention.

Referring to FIG. 3, an engine control system in accordance with a particular embodiment includes an engine control module (or simply "control module") 302, a battery control module 316, a battery 310, and an engine 102 coupled in the conventional manner to a generator 204. Engine control module 302 communicates with battery control module 318 (e.g., via a serial data link or other suitable connection) and receives feedback information from generator 204 (e.g., the current, voltage, and speed of generator 204). Control module 302 also receives inputs such as throttle position 320 and vehicle speed 322. It will be appreciated that engine control module may in practice communicate with various other automotive systems, and that the system shown in FIG. 3 is simplified for clarity. Furthermore, while the systems shown in the drawings are incorporated into a vehicle, the present invention is not so limited, and may be incorporated into an aircraft, a marine vessel, or any other application in which an internal combustion engine may be used.

Battery control module 316 senses the state of battery 310 through any convenient method—for example, a current sense 314 leading from one terminal of battery 310, or a voltage sense 312 leading to both terminals. As shown, battery 310 and generator 204 will typically communicate with various external loads 308.

As mentioned above, control module 302 provides three control channels to engine 102 and generator 204: air control 106, spark control 108, and generator control 202. Air control 106 may be provided, for example, through the use of a conventional throttle device, and spark control 108 may be provided via a conventional spark advance/retarding control system as described above.

Generator control 202 comprises any suitable combination of signals and actuators capable of altering operation of generator 204 such that the torque and speed of engine 102 (which is mechanically coupled to generator 204) can likewise be increased or reduced during idle or other conditions. Stated another way, the torque absorption of generator 204 is modified to stabilize output 112 of engine 102, rather than using spark control 108 alone. The nature of signaling used by control module 302 to control generator 204 may vary depending upon application, but in one embodiment is a pulse-width modulation (PWM) control signal.

In one embodiment, generator 204 is configured to operate in a voltage control mode and a field duty cycle control mode. Control module 302 determines the correct mode based on, for example, vehicle speed 322, throttle position 320, and state of battery 310 as determined via battery control module 316. Generator 204 is operated in voltage control mode when the voltage (or other state) of battery 310 is outside a predetermined range. For the structure and operation of such electrical generators, see, e.g., U.S. Pat. No. 7,009,365, entitled "Systems and Methods for Control of Vehicle Electrical Generator," issued Mar. 7, 2006 to the present assignee.

During operation of system 300, control module 302 commands generator 204 to increase the steady-state torque on engine 102. This provides a large torque reserve with which to control output 112. At the same time, the output current of generator 204 is used to charge battery 310. Battery 310 can then be discharged during off-idle driving to maintain an optimal battery state of charge (for example, 70%-80% charge).

Control module 302 monitors the speed of engine 102 via output 112 and calculates a desired engine torque to correct the error between the desired RPM (derived from 320 and 322, for example) and output 112. That is, the system attempts to reduce the absolute value of the difference between the desired speed and the actual speed. Note that control module 302 includes any combination of hardware, software, and firmware capable of carrying out the functions disclosed herein. That is, controller 104 will typically include various microprocessors, memories, and other electronic components well known in the art, as well as stored computer code, parameters, look-up tables, and the like.

Control module 302 arbitrates between controls 108 and 202—that is, command torques due to spark advance and generator torque—to reduce the speed error. In one embodiment, the spark advance torque is converted into a final spark advance based on an engine torque model. Similarly, the desired generator torque is converted into a generator field duty cycle using a generator model.

If engine 102 exhibits an output speed 112 that is less than the desired speed, control module 302 detects this change and commands generator 204 to decrease the load on engine 102 by decreasing generator torque until the desired speed is achieved. If, on the other hand, engine 102 exhibits an output speed 112 that is greater than the desired speed, then control module 302 commands generator 204 to increase the load on engine 102. Because generator 204 has torque control capability that is similar to spark timing control with respect to speed of response and range of torque, there is less need to rely on spark timing for torque control. This allows the spark setting to be moved closer to the most efficient operating point (MBT), thereby improving fuel economy.

In accordance with one embodiment, the maximum torque reserve due to generator load at typical idle speeds is about 30 Nm at engine 102. Since this torque reserve is sufficient for engine stall prevention, the spark control 108 is preferably used for smaller engine torque variations while generator control 202 is used for larger variations.

In general, the arbitration of torque controls 108 and 202 by control module 302 is dependent on the state of battery 310 and loads 308. In the case of a fully charged battery 310, it is possible for the torque of generator 204 to be increased at idle, with engine torque controlled solely by the spark. Similarly, if, for example, the head lamps are "on," and voltage variations due to generator torque control are not acceptable, the engine torque control may revert to spark control.

Similarly, during coast-down (deceleration) of the vehicle, the generator torque may be increased to reduce the work to be done by the braking system. As the generator torque is increased, the generator current will increase, thereby charging battery 310. Under cruising conditions the generator torque can be reduced and battery 310 can be discharged.

Control module 302 may monitor vehicle conditions and may disable the use of generator torque control (and revert solely to spark control 108) under certain operating conditions—e.g., when the vehicle headlamps are "on," or the air-conditioner system is on "high." This helps minimize the impact of voltage fluctuations on systems that are perceivable by the driver, and also increases the life of electrical components.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. An engine control system in a vehicle, the system comprising:
    an engine;
    an electrical generator mechanically coupled to the engine such that the engine is subject to a torque load from the electrical generator, wherein the electrical generator is configured to change the torque load in response to a torque load request signal;
    an engine control module communicatively coupled to the engine and the electrical generator, the engine control module configured to receive a desired speed of the engine, determining an actual speed of the engine, compare the desired speed and the actual speed to determine an error value, and modify the torque load of the generator based on the error value such that the absolute value of the error value is reduced.

2. The control system of claim 1, further including a spark controller coupled to the engine and the engine control module, wherein the engine control module is further configured to instruct the spark controller to modify a spark characteristic of the engine based on the error value such that the absolute value of the error value is reduced.

3. The control system of claim 2, further including:
    a battery coupled to the generator;
    a battery control module coupled to the generator and the engine control module, wherein the engine control module is configured to determine a state of the battery via the battery control module.

4. The control system of claim 3, wherein the engine control module is configured to modify the torque load and the spark characteristic based on the error value and the state of the battery.

5. The control system of claim 4, wherein the engine control module is configured to modify the torque load and the spark characteristic further based on an acceleration of the vehicle.

6. The control system of claim 3, wherein the engine control module is further configured to modify an airflow rate to the engine.

7. The control system of claim 3, wherein the generator is configured to operate in a voltage control mode and a field duty cycle mode.

8. An engine control module coupled to an internal combustion engine within a vehicle, wherein the engine is subject to a torque load from a generator, the engine control module configured to:
    receive a desired speed of the engine;
    determine an actual speed of the engine;
    compare the desired speed and the actual speed to determine a speed error value;
    modify the torque load of the generator based on the speed error value such that the absolute value of the speed error value is reduced.

9. The engine control module of claim 8, wherein the engine is coupled to a spark controller, wherein the engine control module is further configured to modify a spark timing characteristic of the spark controller based on the speed error value.

10. The engine control module of claim 9, wherein the engine is coupled to a throttle actuator, wherein the engine control module is further configured to modify the throttle actuator based on the speed error value.

11. A method for controlling an internal combustion engine in a vehicle, wherein the engine is subject to a torque load from a generator coupled to the engine, the method comprising:
    receiving a desired speed of the engine;
    determining an actual speed of the engine;
    comparing the desired speed and the actual speed to determine a speed error value;
    modifying the torque load of the generator based on the speed error value such that the absolute value of the speed error value is reduced.

12. The method of claim 11, wherein the engine is coupled to a spark controller, further including the step of modifying a spark timing characteristic of the spark controller based on the speed error value.

13. The method of claim 12, wherein the spark timing characteristic and the torque load of the generator are arbitrated based on the speed error value and at least one external factor.

14. The method of claim 13, wherein the at least one external factor includes the state of a battery that communicates with the generator.

15. The method of claim 13, wherein the at least one external factor includes the state of an electrical system coupled to the generator.

16. The method of claim 14, further including using the generator to charge the battery during deceleration of the vehicle.

17. The method of claim 12, wherein the engine is coupled to a throttle actuator, further including the step of modifying the throttle actuator based on the speed error value.

* * * * *